United States Patent
Yi

(10) Patent No.: US 7,151,791 B2
(45) Date of Patent: Dec. 19, 2006

(54) DEVICE FOR REGENERATING DATA FROM SIGNALS TRANSMITTED THROUGH PLURAL ANTENNA

(75) Inventor: Chae-Hag Yi, Yongin-shi (KR)

(73) Assignee: Samsung Electronics, Co., Ltd. (KR)

( * ) Notice: Subject to any disclaimer, the term of this patent is extended or adjusted under 35 U.S.C. 154(b) by 772 days.

(21) Appl. No.: 10/131,174

(22) Filed: Apr. 24, 2002

(65) Prior Publication Data

US 2003/0002567 A1    Jan. 2, 2003

(30) Foreign Application Priority Data

Jun. 16, 2001    (KR) ............................... 2001-34185

(51) Int. Cl.
*H04B 1/69*    (2006.01)
(52) U.S. Cl. ..................... 375/141; 375/148
(58) Field of Classification Search ................ 375/316, 375/130, 147, 140, 148, 141, 144, 358; 455/526; 370/335, 342, 441
See application file for complete search history.

(56) References Cited

U.S. PATENT DOCUMENTS

| | | | | |
|---|---|---|---|---|
| 5,548,613 A | * | 8/1996 | Kaku et al. ................. | 375/150 |
| 5,790,588 A | * | 8/1998 | Fukawa et al. ............. | 375/148 |
| 6,069,912 A | * | 5/2000 | Sawahashi et al. ......... | 375/142 |
| 6,628,702 B1 | * | 9/2003 | Rowitch et al. ............ | 375/150 |
| 6,731,622 B1 | * | 5/2004 | Frank et al. ................ | 370/342 |
| 6,888,878 B1 | * | 5/2005 | Prysby et al. ............... | 375/148 |
| 2001/0053140 A1 | * | 12/2001 | Choi et al. .................. | 370/335 |
| 2002/0106008 A1 | * | 8/2002 | Guey ......................... | 375/148 |
| 2002/0126746 A1 | * | 9/2002 | Rick et al. .................. | 375/148 |
| 2002/0136158 A1 | * | 9/2002 | Frank ......................... | 370/209 |
| 2003/0076795 A1 | * | 4/2003 | Bender et al. .............. | 370/332 |
| 2004/0010744 A1 | * | 1/2004 | Chen et al. ................. | 714/755 |

* cited by examiner

*Primary Examiner*—Tesfaldet Bocure
(74) *Attorney, Agent, or Firm*—Mills & Onello LLP

(57) ABSTRACT

A device for restoring data from signals transmitted through plural antenna includes a plurality of despreading units to restore pilot and data signals by means of pilot and data Walsh codes, a path controller to selectively activate the despreading units, an antenna-waiting signal generator to generate an antenna-waiting signal with the pilot signals output from the despreading units, an adder to sum the data signals output from the despreading units, and a controller to control the path controller and the adder in accordance with a transmission scheme of a base station. The invention provides one receiver system for a mobile terminal to be adaptable to various environments of transmission diversity with base stations, such as orthogonal transmission diversity (OTD), time-switched transmission diversity (TSTD), selection diversity (STD), or transmission antenna array (TXAA).

8 Claims, 6 Drawing Sheets

DEVICE FOR REGENERATING DATA FROM SIGNALS TRANSMITTED THROUGH PLURAL ANTENNA

RELATED APPLICATION

This application relies for priority upon Korean Patent Application No. 2001-34185, filed on Jun. 16, 2001.

FIELD OF THE INVENTION

The present invention generally relates to devices for restoring data from signals transmitted through plural antennas, and more particularly to terminal-specific receivers usable in various features of base-station transmission diversities.

BACKGROUND OF THE INVENTION

As is presently known, CDMA 2000 as the third-generation cellular system is in need of a larger system capacity to transmit high-speed packet data as well as audio data. Such extension of system capacity confronts several obstacles involved in inherent properties of wireless communication systems. It is well known that the most important factor in mobile communication is to reduce "fading" that causes distortions of received signals.

In overcoming fading, it is preferred to employ diversity techniques. The diversity is generally used to combat multi-path fading, being applied on both the transmission and reception sides. There are essentially three kinds of diversity: time, frequency, and space.

In the CDMA 2000 system, a forward link governs system capacity because it has a smaller channel capacity than a reverse link, in contrast to the second-generation cellular system. Those conditions arise from the fact that the forward link is available to apply the maximal ratio coupling to a reception signal on the reception diversity employing two antennas at a base station. Since applying the reception diversity of two antennas burdens a terminal, the CDMA 2000 system employs the base station transmission diversity so as to balance the difference between channel capacities of the forward and reverse links.

There have been proposed several kinds of transmission diversity techniques, such as OTD (orthogonal transmission diversity), TSTD (time-switched transmission diversity), STD (selection diversity), TXAA (transmission antenna array), and so on. It would not be apparent to discriminate superiority and inferiority between the diversity techniques about which one is capable of facilitating an optimal trade-off in view of functional enhancement in comparison with implementation complexity. It may be general to choose the best way among them in accordance with a given communication environment.

SUMMARY OF THE INVENTION

It is, therefore, an object of the present invention to provide a terminal-specific receiver adaptable to various environments of base station transmission diversity such as OTD, TSTD, STD, TXAA, and so on.

In order to attain the above objects, according to an aspect of the present invention, there is provided a data regeneration device. The device includes a plurality of despreading units for regenerating pilot and data signals by means of pilot and data Walsh codes; a path controller for selectively activating the despreading units; an antenna-waiting signal generator for creating an antenna-waiting signal using the pilot signals output from the despreading units; an adder for summing the data signals output from the despreading units; and a controller to control the path controller and the adder in accordance with a transmission scheme of a base station.

In one embodiment, the despreading unit comprises a pilot integrator for synthesizing the pilot signals by despreading transmission signals with the pilot Walsh code; a data integrator for synthesizing the data signals by despreading the transmission signal with the data Walsh code; and a delay unit for delaying the transmission signal, which is applied to the pilot and data integrators, for a predetermined time.

The data integrator outputs the data signal by multiplying the pilot signal by a despreading result of the transmission signal with the data Walsh code.

Each of the despreading units can further include a path estimator for evaluating a phase and a gain of the pilot signal generated from the pilot integrator. Also, the antenna-waiting signal generator can output the antenna-waiting signal using an output of the path estimator.

The despreading units are preferably to be composed of two in number.

In applying the invention to a diversity mode, the despreading units are controlled to regenerate the data signals by means of data Walsh codes, which are the same with each other and are twice the length of those for a single antenna. The path controller is controlled to enable all the despreading units, and the adder is controlled to alternately output the data signals regenerated from the despreading units.

In applying the invention to another diversity mode, the despreading units are controlled to regenerate data signals by means of data Walsh codes, which are the same with each other and are the same length as those for a single antenna. The path controller controlled to alternately enable the despreading units in accordance with a predetermined pattern, and the adder is controlled to output data signals regenerated by one of the despreading units, in series, which is selected in accordance with the predetermined pattern.

In applying the invention to still another diversity mode, the despreading units are controlled to regenerate data signals by means of data Walsh codes, which are the same with each other and are the same length those for a single antenna. The path controller enables all the despreading units, and the adder sums data signals regenerated by the despreading units.

As a result, the present invention provides a terminal-specific receiver adaptable to various environments of base station transmission diversity such as OTD, TSTD, STD, TXAA, or so on.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIMENTS

Figure 1:
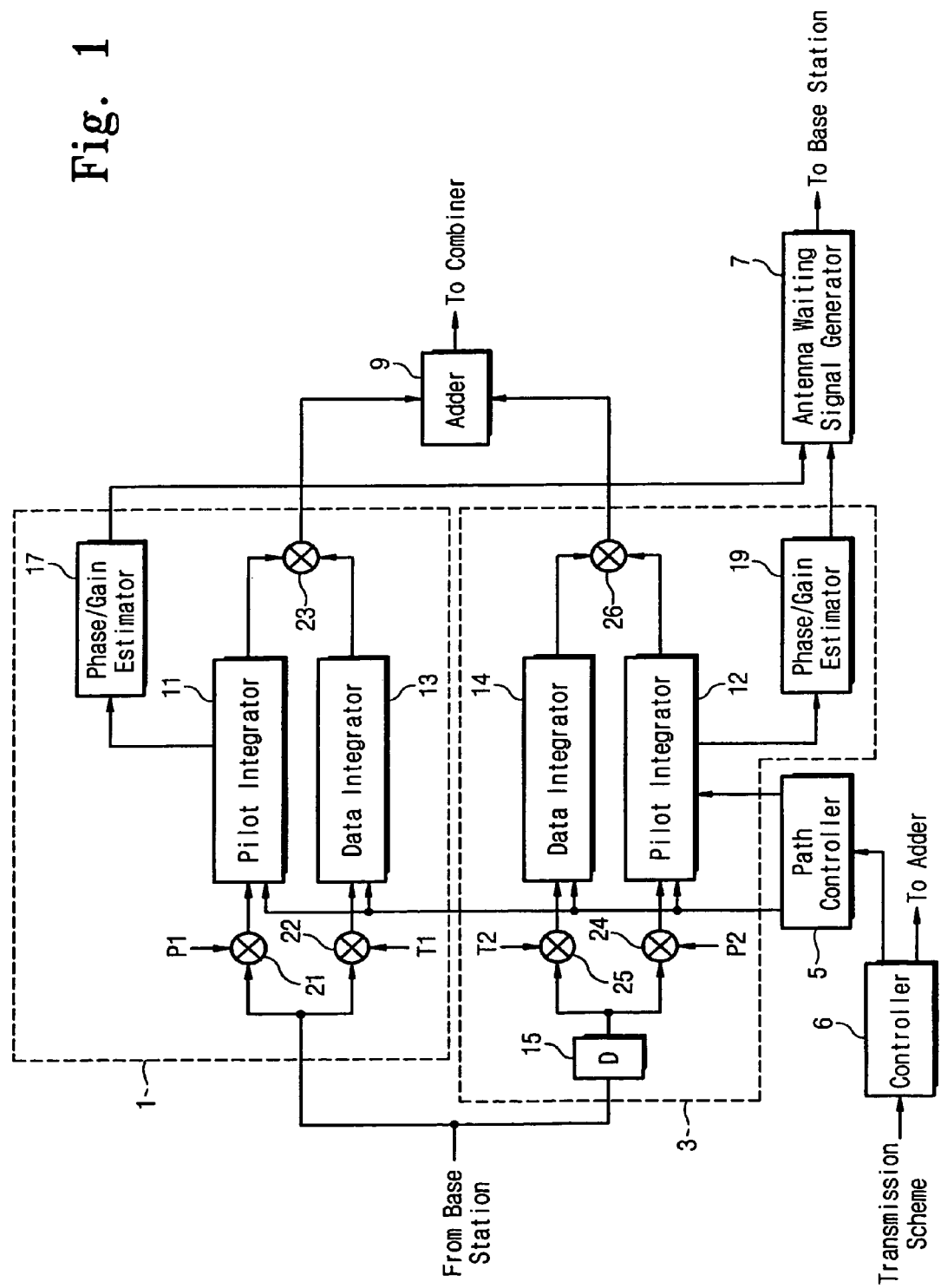
FIG. 1 is a diagram illustrating a configuration of a receiver for a terminal according to the invention.

FIG. 1 shows a configuration of a terminal-specific receiver according to an embodiment of the invention. Referring firstly to FIG. 1, the receiver has two despreading units 1 and 3, a path or route controller 5, an antenna-waiting signal generator 7, an adder 9, and a control block (or a controller) 6 to control the functional components. The controller 6 receives information or data relating to a transmission scheme from a base station. A base station transmits signals using a different transmission scheme in each transmission diversity technique.

The despreading units, 1 and 3, include: pilot integrators (or synthesizers), 11 and 12, to synthesize (or integrate) pilot signals by despreading signals, which are transmitted from a base station by means of pilot Walsh codes P1 and P2 corresponding thereto; data integrators, 13 and 14, to synthesize data signals by despreading the transmission signals by means of data Walsh codes T1 and T2; a delay unit 15 to delay transmission signals applied to the pilot and data integrators for a predetermined time; and multipliers 21 through 26. The pilot Walsh code P1 and the data Walsh code T1 are used for regeneration of pilot and data signals in the despreading unit 1, while the pilot Walsh code P2 and the data Walsh code T2 are used for regeneration of pilot and data signals in the other despreading unit 3. The delay unit 15 is provided to offset routing skews between antennas of the base station. The present embodiment utilizes the delay unit 15 only in the despreading unit 3, as shown.

The data Walsh codes, T1 and T2, are dependent on a kind of diversity mode. For instance, in the case in which the terminal-specific receiver is associated with OTD, T1 and T2 are not equal and the controller 6 operates the despreading units, 1 and 3, to make the Walsh codes twice longer than those without diversity. On the contrary, in the conditions of TSTD, STD, and TXAA, T1 and T2 are identical and the length of Walsh code is the same as that with diversity.

The multipliers, 21 and 22, regenerate pilot and data signals by multiplying a signal from the base station respectively by the pilot and data Walsh codes P1 and T1. Outputs from the multipliers 21 and 22 are applied to the pilot and data integrates, 11 and 13, respectively. Synthesized pilot and data signals in the integrators, 11 and 13, are multiplied at the multiplier 23. That is, a data signal restored (or regenerated) by a despreading operation with the data Walsh code is multiplied by a pilot signal restored in order to load a path characteristic on the data signal. In the despreading unit 3, the multipliers, 24 and 25, regenerate pilot and data signals by multiplying the signal passing through the delay unit 15 from the base station by the pilot and data Walsh codes P2 and T2, respectively, which performs independent from that in the despreading unit 1. Outputs from the multipliers 24 and 25 are applied to the pilot and data integrators, 12 and 14, respectively. Synthesized pilot and data signals in the integrators, 12 and 14, are multiplied at the multiplier 26.

As shown in FIG. 1, path or phase/gain estimators 17 and 19 are also provided in the receiver, being associated with the antenna-waiting signal generator 7. The path estimator 17 evaluates a phase and a gain of the pilot signal generated from the pilot integrator 11 of the despreading unit 1, and then applies a signal indicative of a path characteristic to the antenna-waiting signal generator 7. The other path estimator 19 in the despreading unit 3 carries out the same operation as the operation of path estimator 17 on the pilot signal generated by the pilot integrator 12. The antenna-waiting signal generator 7 checks out characteristics of transmission routes on the basis of outputs provided from the path estimators 17 and 19, and generates control information for adjusting power rates of signals transferred from antennas corresponding thereto. The control information returns to a base station through a feedback channel, and the two antennas installed in the base station control power rates of the transmission signals. The base station controls a power of the antenna based on the control information. The control information is composed of one bit when the receiver is conductive in STD, while composed of multiple bits in TXAA. Whether the antenna-waiting signal generator 7 is active or not depends on the transmission scheme of the base station. The antenna-waiting signal generator 7 is active in the condition of STD or TXAA. The STD and TXAA transmit messages of one bit and multiple bits, respectively, to a base station through the feedback channel.

The path controller 5 alternately activates the two despreading units, 1 and 3, in accordance with a present diversity condition. For example, the despreading units 1 and 3 are all active in OTD or TXAA. On the other hand, an alternate one of the despreading units is conductive in accordance with an intrinsic pattern associating antennas at a base station in TSTD, or in accordance with an antenna selection message in STD. Such an operation with the path controller 5 is regulated by the controller 6.

The adder 9, for summing data signals generated from the despreading units in response to the controller, conducts a summing operation with the data signals in accordance with a present diversity condition. First, in OTD, data signals from the despreading units 1 and 3 are alternately rearranged and output from the adder. In TSTD or STD, a data signal from a selected one of the despreading units is just turned out of the adder. In TXAA, the adder generates a sum of data signals provided from the despreading units 1 and 3.

Assuming that a length of the Walsh code in the case without the diversity techniques is N (N is a positive integer), the receiver of the invention conducts in the unit of N chips (or bits). In FIG. 1, it is preferably designed for the pilot and data integrators, 11 and 13, to receive a signal from one of the two antennas installed at the base station while for the pilot and data integrators, 12 and 14, to receive a signal from the other one of the two antennas. The reverse can also occur. The signals from the transmission antennas are demodulated, each being regarded as an independent one. That is, the pairs of the pilot and data integrators receive their own signals with independent pilots, and the signals each maintain their specific timing by means of independent time-tracking.

Operational features specified with the diversity modes are summarized in Table I below.

TABLE I

|      | Walsh T1, T2            | Path Controller          | Adder                                    |
|------|-------------------------|--------------------------|------------------------------------------|
| OTD  | T1 ≠ T2 Length = 2N     | All Spreading units Active | Alternate Output                      |
| TSTD | T1 = T2 Length = N      | Selected Spreading Unit Active | Data Signal of Selected Spreading Unit |

TABLE I-continued

| | Walsh T1, T2 | Path Controller | Adder |
|---|---|---|---|
| STD | T1 = T2 Length = N | Selected Spreading Unit Active | Data signal Selected Spreading Unit Output After Summing |
| TXAA | T1 = T2 Length = N | All Spreading Unit Active | |

Operations of receivers in accordance with the diversity modes will now be described.

Figure 2A:
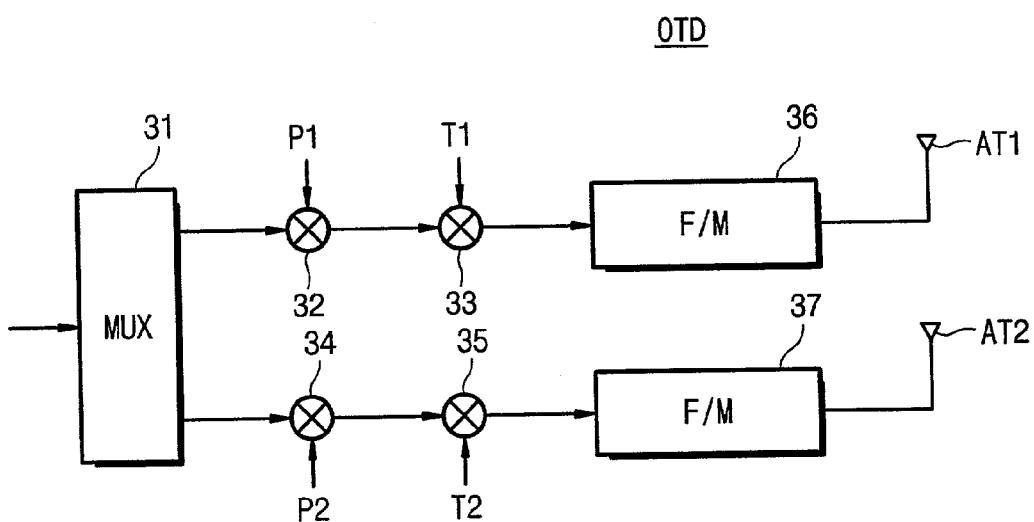
FIGS. 2A and 2B are diagrams illustrating configurations of an OTD transmitter and receiver, respectively.
Figure 2B:
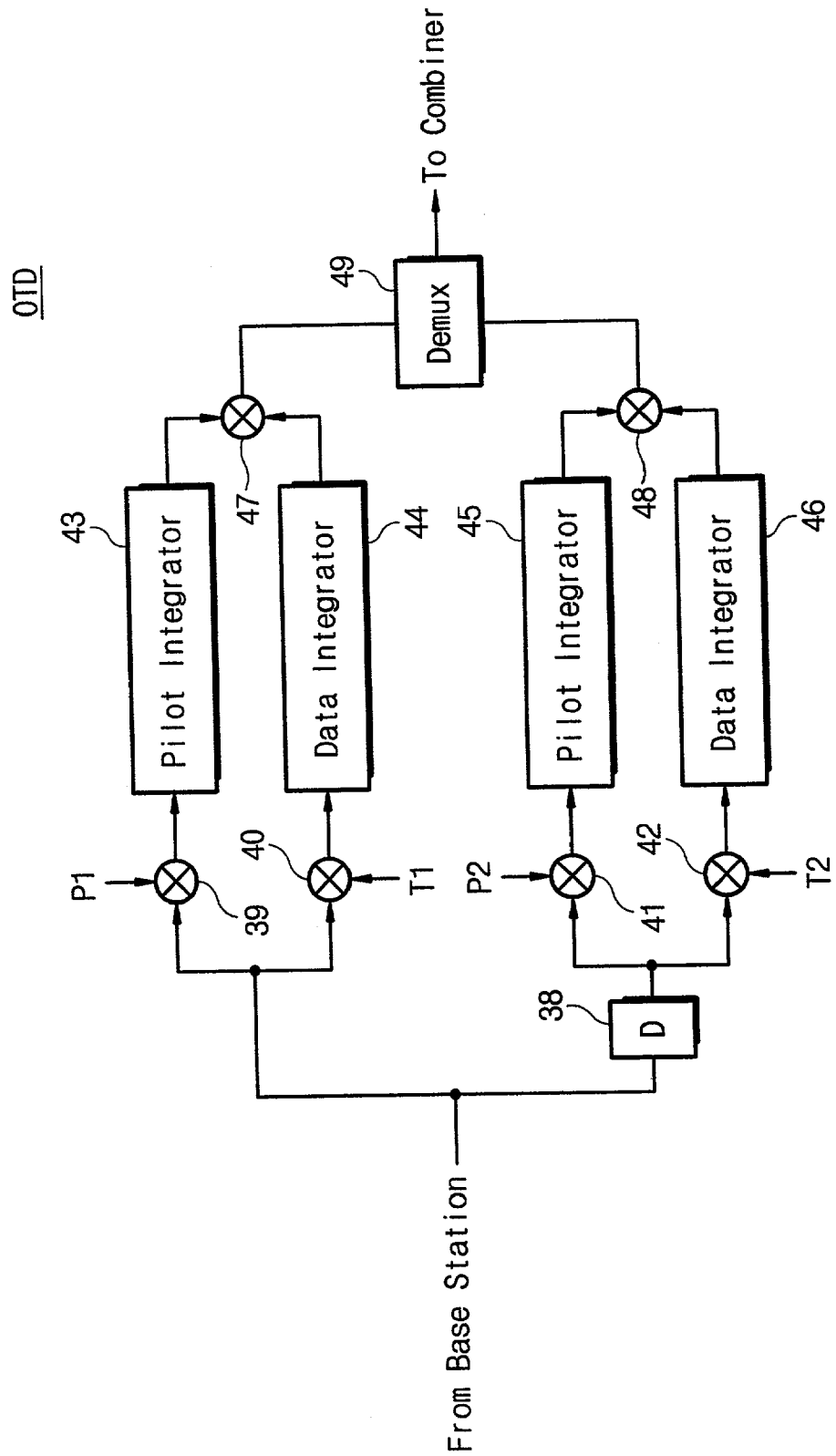

FIGS. 2A and 2B show functional configurations of a transmitter and a receiver, respectively, which are associated with OTD. OTD transmits signals, which are divided into two different bit streams of the channel-coded and interleaved, through individual antennas at the same time. Therefore, two antennas AT1 and AT2 are always in use. Independent Walsh spreading codes are each assigned to the bit streams so as to render orthogonality on the bit streams. In FIG. 2A, one of the two bit streams is composed of multipliers 32 and 33, and a filtering/modulation (F/M) unit 36, and the other one is composed of multipliers 34 and 35, and filtering/modulation unit 37. A multiplexer (MUX) generates two types of signal: one is transmitted from the antenna AT1 after being multiplied by the pilot and data Walsh codes, P1 and T1 on one of the bit streams; the other is transmitted from the antenna AT2 after being multiplied by the pilot and data Walsh codes, P2 and T2 on the other bit stream. The bit streams can be more segmented into larger numbers, e.g., three or four. Once a common pilot is applied to one of the antennas, e.g., AT1, the other antenna, e.g., AT2, cooperates with an auxiliary pilot. Assuming that the length of Walsh code is N, the length of the Walsh codes T1 and T2 becomes 2N in FIG. 2A.

In the OTD receiver shown in FIG. 2B, symbol data signals that are individually demodulated through the segmented bit streams are arranged in a demultiplexer (DE-MUX) 49, and an output of the demultiplexer 49 is applied to a combiner. At this time, the length of the data Walsh codes T1 and T2 is 2N.

In applying the present receiver of the invention, shown in FIG. 1, into the OTD mode, the two despreading units 1 and 3 are controlled to regenerate data signals by means of data Walsh codes, which are different from each other, with the length of 2N that is twice that with a single antenna. The path controller 5 enables all the despreading units 1 and 3, and the adder 9 alternately outputs the data signals regenerated from the despreading units 1 and 3. Such a control mechanism by controller 6 makes the receiver of FIG. 1 operable in the OTD mode.

Figure 3A:
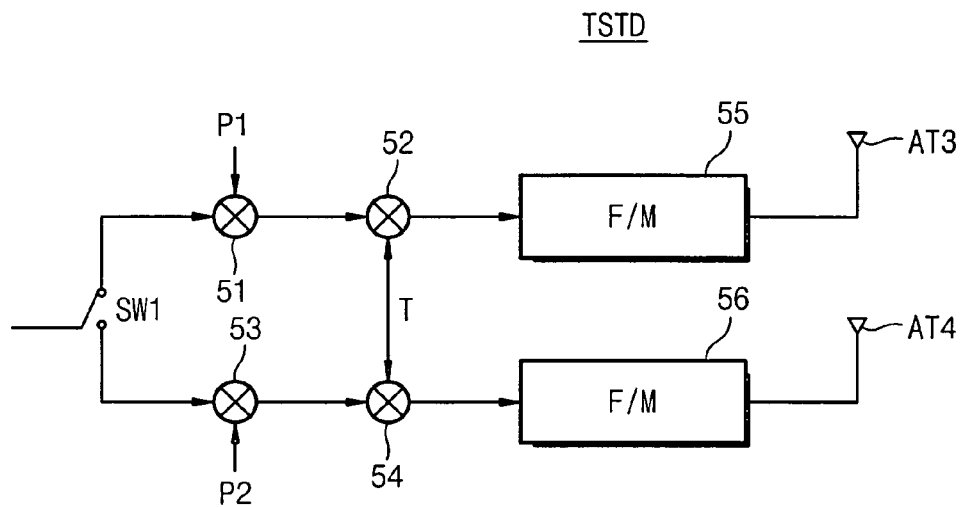
FIGS. 3A and 3B are diagrams illustrating configurations of a TSTD transmitter and receiver, respectively.
Figure 3B:
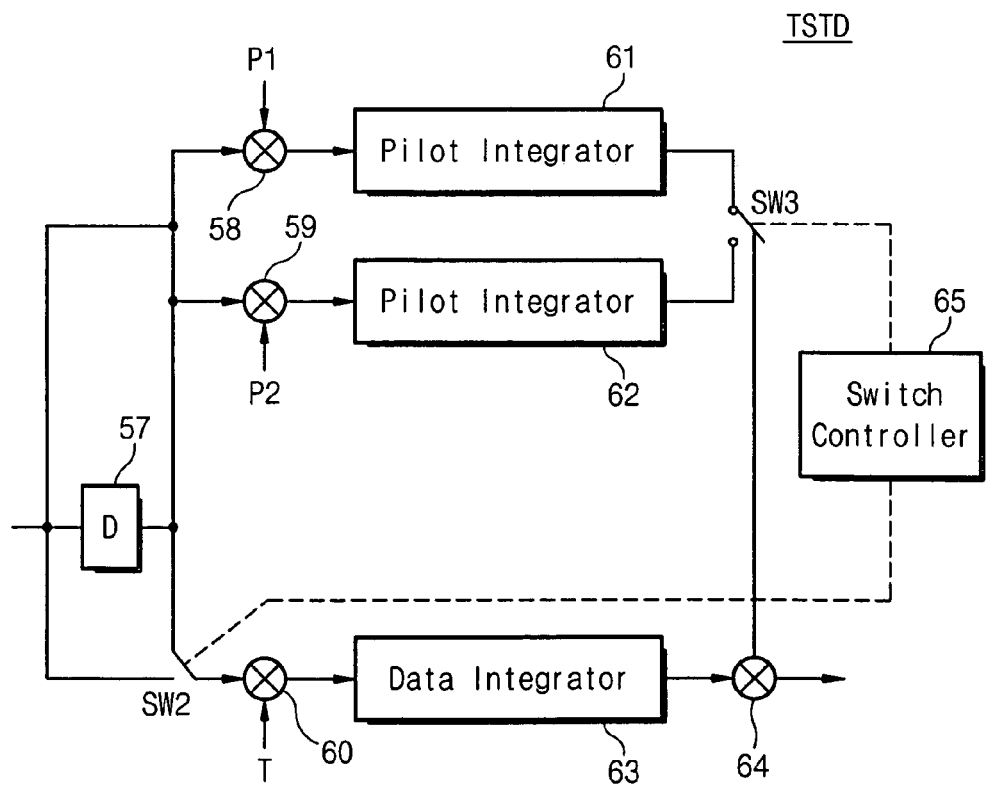

FIGS. 3A and 3B show configurations of a transmitter and a receiver, respectively, in the TSTD mode. In the TSTD mode, only one of antennas AT3 and AT4 is usable, although with the same Walsh codes thereon. As in the OTD mode, when a common pilot, e.g., P1, is associated with one of the antennas, the other antenna is associated with an auxiliary pilot. Assuming that a length of a Walsh code is N at a non-diversity mode, the length of a data Walsh code T in FIG. 3A becomes N. A switch SW1 permits users to alternate between the two antennas by means of irregular specific patterns. The irregular specific patterns shall be designed to secure half users on an average to use a single antenna.

The receiver shown in FIG. 3B employs the same data Walsh code T with the length of N. Switches SW2 and SW3 allow users to alternate between the two antennas by means of irregular specific patterns. The irregular specific patterns are preliminarily provided into a mobile station by information exchange with the base station.

In applying the present receiver of the invention, shown in FIG. 1, into the TSTD mode, the two despreading units 1 and 3 are controlled to regenerate data signals by means of data Walsh codes, which are the same from each other, with the length of N that is identical to that with a single antenna. The path controller 5 enables all the despreading units 1 and 3 in accordance with specific patterns that are used in selecting the antennas at the base station, and the adder 9 outputs a data signal of a selected one of the despreading units 1 and 3. Such a control mechanism by controller 6 makes the receiver of FIG. 1 operable in the TSTD mode.

Figure 4A:
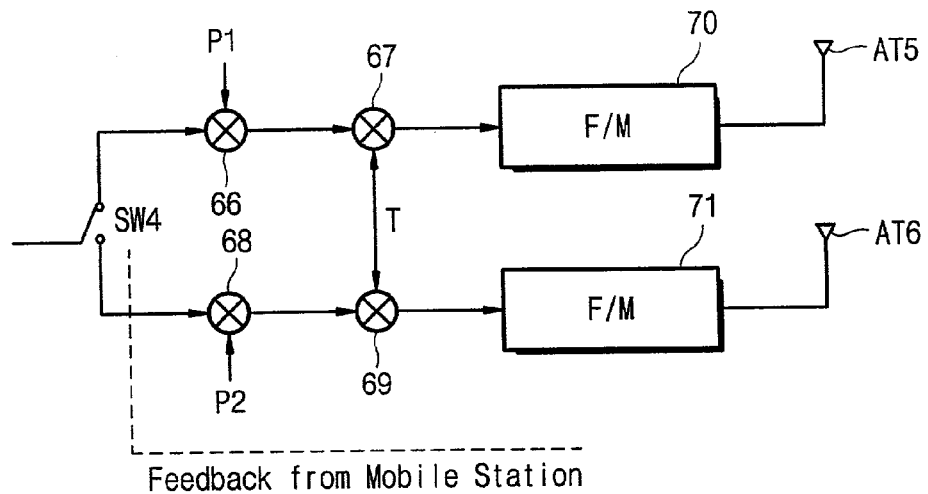
FIGS. 4A and 4B are diagrams illustrating configurations of an STD transmitter and receiver, respectively.
Figure 4B:
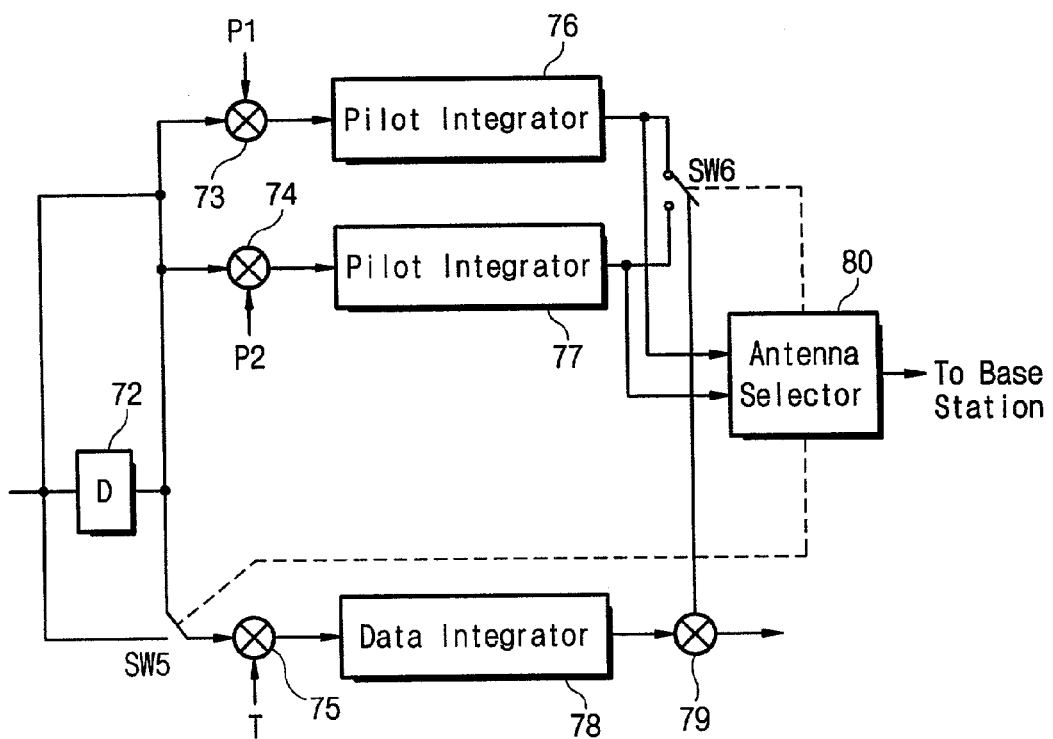

FIGS. 4A and 4B show configurations of a transmitter and a receiver, respectively, in the STD mode. The STD is proposed to enhance a function of the TSTD that is short of obtaining the best condition of SNR (signal-to-noise ratio) all the time at a receiver of a terminal. With an ideal case, the best performance of a receiver can be present if an antenna with the maximal SNR of reception at a terminal is selected by means of a switch SW4. However, it is practically impossible because there is no way to detect a status of a mobile communication channel at a base station. Since there is a feedback channel from a terminal to a base station, it is available to enhance an operational function with displaying an antenna, which is the one securing a higher SNR, on a terminal. At this time, the terminal offers antenna information to the base station by means of a one-bit antenna selection message, considering a channel capacity of a forward link. A speed in selecting an antenna heavily influences STD performance.

In FIG. 4B, the length of a data Walsh code T is N. Switches SW5 and SW6 are operable in accordance with an antenna selection message that is transferred to the base station from an antenna selector 80. The antenna selection message is conductive, not directly applied to the switches, after round-trip delays and processing times in the base station and terminal.

In applying the present receiver of the invention, shown in FIG. 1, into the STD mode, the two despreading units 1 and 3 are controlled to regenerate data signals by means of data Walsh codes, which are the same from each other, with the length of N that is identical to that with a single antenna. The path controller 5 selects the despreading units 1 and 3 in accordance with the antenna selection message. The adder 9 outputs a data signal of a selected one of the despreading units 1 and 3. Such a control mechanism by controller 6 makes the receiver of FIG. 1 operable in the STD mode.

Figure 5A:
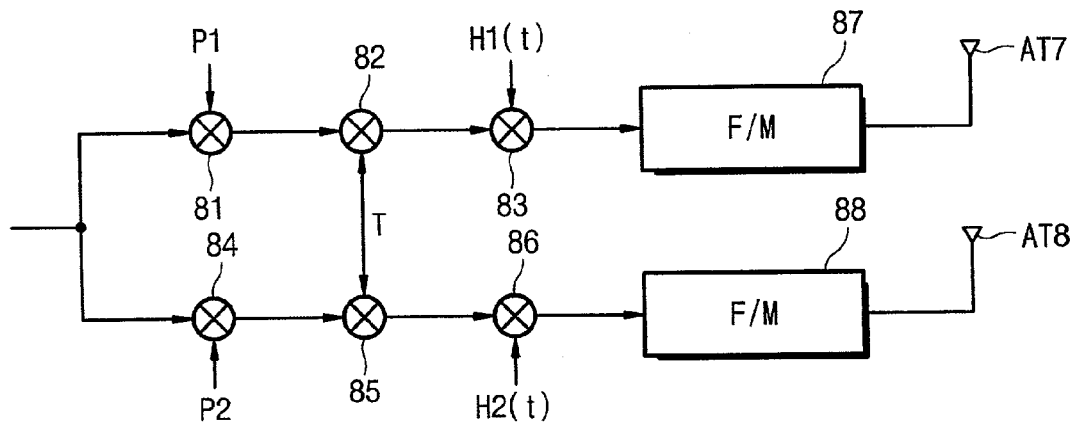
FIGS. 5A and 5B are diagrams illustrating configurations of a TAAA transmitter and receiver, respectively.
Figure 5B:
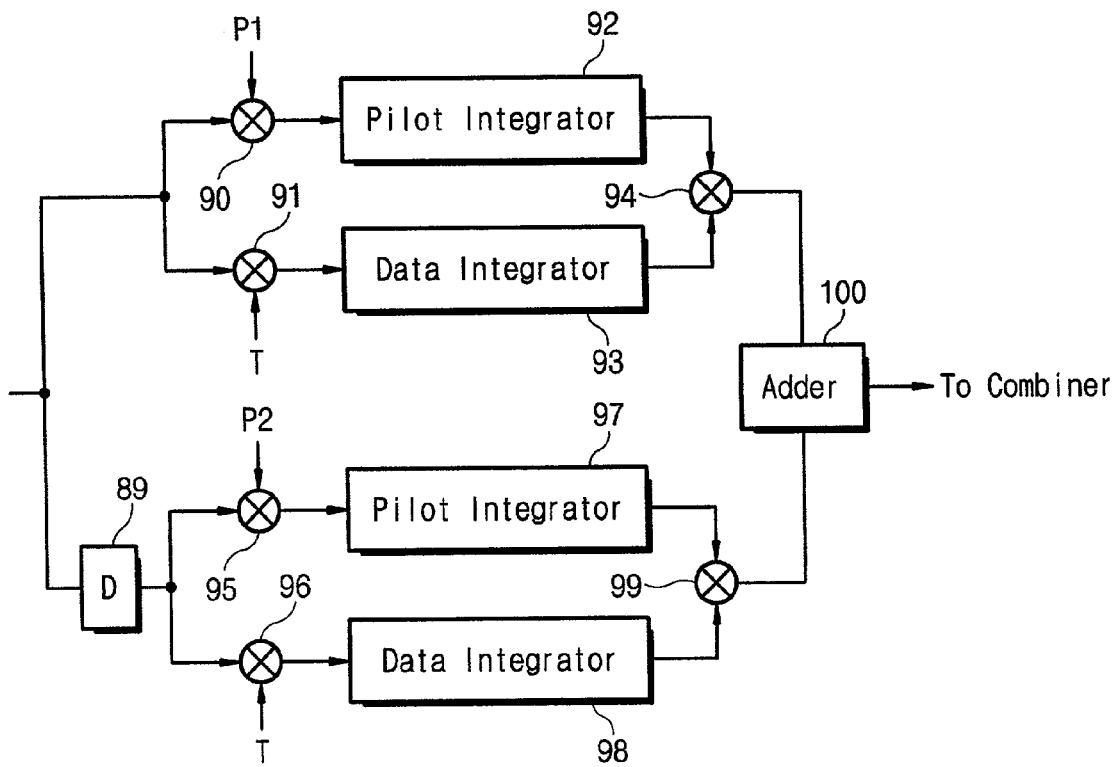

FIGS. 5A and 5B show configurations of a transmitter and a receiver, respectively, of the TXAA mode. The TXAA mode transmits the same data signals through two antennas, AT7 and AT8, by means of the same Walsh codes. There occurs a waiting step with antenna information that arrives through a feedback channel from a terminal before the transmission. Assuming that the length of Walsh code without diversity is N, a data Walsh code T of FIG. 5A has the length of N. The values of H1(t) and H2(t) are established by the antenna-waiting signal transmitted from a terminal through the feedback channel. The values of H1(t) and H2(t) adjust phases and gains of signals transmitted through the antennas to be the maximal SNR.

In FIG. 5B, as the same data signals are transmitted through the two antennas, AT7 and AT8, with the same Walsh codes, the TXAA receiver sums the two-way results at an adder 100 and then the summed result is applied to a combiner.

In applying the present receiver of the invention, shown in FIG. 1, into the TXAA mode, the two despreading units 1 and 3 are controlled to regenerate data signals by means of data Walsh codes, which are the same from each other, with the length of N that is identical to that with a single antenna. The path controller 5 enables all the despreading units 1 and 3, and the adder 9 sums data signals regenerated by the despreading units 1 and 3. Such a control mechanism by 6 controller makes the receiver of FIG. 1 operable in the TXAA mode.

As described above, the present invention provides one receiver system for a mobile terminal to be adaptable to various environments of transmission diversity with base stations, such as OTD, TSTD, STD, or TXAA.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A data regeneration device comprising:
    a plurality of despreading units for regenerating pilot and data signals by means of pilot and data Walsh codes;
    a path controller for selectively activating the despreading units;
    an antenna-waiting signal generator for creating an antenna-waiting signal using the pilot signals output from the despreading units;
    an adder for summing the data signals output from the despreading units; and
    a controller to control the path controller and the adder in accordance with a transmission scheme of a base station respective to the antenna waiting signal.

2. The data regeneration device of claim 1, wherein the despreading unit comprises:
    a pilot integrator for synthesizing the pilot signals by despreading transmission signals with the pilot Walsh code;
    a data integrator for synthesizing the data signals by despreading the transmission signal with the data Walsh code; and
    a delay unit for delaying the transmission signal, which is applied to the pilot and data integrators, for a predetermined time.

3. The data regeneration device of claim 2, wherein the data integrator outputs the data signal by multiplying the pilot signal by a despreading result of the transmission signal with the data Walsh code.

4. The data regeneration device of claim 2, wherein each of the despreading units further comprises a path estimator for evaluating a phase and a gain of the pilot signal generated from the pilot integrator, and the antenna-waiting signal generator outputs the antenna-waiting signal with using an output of the path estimator.

5. The data regeneration device of claim 1, wherein the despreading units are composed of two in number.

6. The data regeneration device according to one of claims 1 and 5, wherein:
    the despreading units are controlled to regenerate the data signals by means of data Walsh codes, which are the same with each other and are twice the length as those for a single antenna;
    the path controller is controlled to enable all the despreading units; and
    the adder is controlled to alternately output the data signals regenerated from the despreading units.

7. The data regeneration device according to one of claims 1 and 5, wherein:
    the despreading units are controlled to regenerate data signals by means of data Walsh codes, which are the same with each other and are the same length as those for a single antenna;
    the path controller is controlled to alternately enable the despreading units in accordance with a predetermined pattern; and
    the adder is controlled to output data signals regenerated by one of the despreading units, in series, which is selected in accordance with the predetermined pattern.

8. The data regeneration device according to one of claims 1 and 5, wherein:
    the despreading units are controlled to regenerate data signals by means of data Walsh codes, which are the same with each other and are the same length as those for a single antenna;
    the path controller enables all the despreading units; and
    the adder sums data signals regenerated by the despreading units.

* * * * *